United States Patent
Linden

(10) Patent No.: US 8,254,964 B2
(45) Date of Patent: Aug. 28, 2012

(54) METHOD AND ARRANGEMENT RELATING TO LOCATION BASED SERVICES FOR A COMMUNICATION DEVICE

(75) Inventor: Thomas S Linden, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 547 days.

(21) Appl. No.: 12/391,048

(22) Filed: Feb. 23, 2009

(65) Prior Publication Data
US 2010/0216490 A1 Aug. 26, 2010

(51) Int. Cl.
*H04W 74/00* (2009.01)

(52) U.S. Cl. ............... 455/456.3; 455/456.1; 455/456.6; 709/204

(58) Field of Classification Search .................. None
See application file for complete search history.

(56) References Cited

U.S. PATENT DOCUMENTS

| | | |
|---|---|---|
| 2006/0235967 A1 | 10/2006 | Fritz |
| 2007/0005419 A1 | 1/2007 | Horvitz et al. |
| 2007/0032244 A1* | 2/2007 | Counts et al. ............ 455/456.1 |
| 2007/0112922 A1* | 5/2007 | Kurata et al. ................ 709/206 |
| 2008/0278312 A1 | 11/2008 | Kristensson et al. |
| 2008/0306826 A1* | 12/2008 | Kramer et al. ................ 705/14 |
| 2008/0318626 A1* | 12/2008 | Rofougaran ............... 455/556.1 |
| 2009/0005079 A1* | 1/2009 | Shields et al. ............ 455/456.3 |
| 2009/0307314 A1* | 12/2009 | Smith et al. .................. 709/206 |

FOREIGN PATENT DOCUMENTS
EP 1 732 300 A2 12/2006

OTHER PUBLICATIONS

PCT International Search Report and Written Opinion of the International Searching Authority, corresponding to PCT/EP2009/060885, mailed Feb. 12, 2010, 14 pages.

Jones et al., "People-to-People-to-Geographical-Places: The P3 Framework for Location-Based Community Systems", Computer Supported Cooperative Work, vol. 13, No. 3-4, Aug. 2004, pp. 249-282, XP019236190.

* cited by examiner

*Primary Examiner* — Rafael Pérez-Gutiérrez
*Assistant Examiner* — Suhail Khan
(74) *Attorney, Agent, or Firm* — Harrity & Harrity, LLP

(57) ABSTRACT

A system and method may include receiving information about a movement of a device from a motion detector of the device, receiving information about ambient sound of the device from a sound receiving portion of the device, receiving information about position of the device, corresponding the movement to a particular type of movement that is distinguished from any and/or all other types of possible movements, corresponding the ambient sound to a specific sound, relating the specific movement and the specific sound to a particular event, and providing a location of the event to a user.

8 Claims, 5 Drawing Sheets

METHOD AND ARRANGEMENT RELATING TO LOCATION BASED SERVICES FOR A COMMUNICATION DEVICE

TECHNICAL FIELD

The present invention relates to communication devices in general and a mobile communication device and network in particular, being enabled to detect music and/or motion of the device and feed information to a service.

BACKGROUND OF THE INVENTION

Mobility represents an intrinsic convenience of many types of wireless communication devices, such as cellular telephones and PDAs. Capitalizing on that mobility, it is known to provide certain types of location-based services, such as delivering "static" information to a given mobile device that is particularly relevant to the current location of that device. In this regard, "static" information denotes data that is generally relevant for the mobile device's given locale, such as information on local restaurants and other attractions.

Devices, such as mobile communication devices, e.g., mobile phones have become more and more an integrated part of the daily life.

Mobile communication devices may perform functions other than communication functions to make these devices more useful to consumers. For example, mobile communication devices may be configured to store and play music and/or video files and/or to record still images or video, identify music and detect motion, text messaging capability, Internet browsing functionality, electronic mail capability, video playback capability, audio playback capability, image display capability, position sensing capability and hands-free headset interfaces, etc.

Further, in a limited sense, it is known to deliver some types of dynamic information, such as near real-time traffic information. However, location-based information delivery has heretofore not been configured and employed to enhance the live viewing/listening experience of event attendees.

One application incorporated into many mobile communication devices is music recognition application called TRACKID™, which allows one to record a portion of a song and get track, artist, album information, and other information sent to the device phone in real time.

SUMMARY

The present invention provides a method and arrangement for compiling and providing information for enhancing, simplifying, and/or facilitating access to live events based on information received from one or several mobile communication devices present at the live events.

Thus, according to a first aspect of the invention a method of providing information about an event based on information obtained from a communication device, which at least comprises a motion detector and a sound receiving portion. The method comprises: compiling information about: a movement of the communication device, ambient sound received by the sound receiving portion, and position of the device; relating the movement and the ambient sound to an event, and providing position of the event. The method may further comprise receiving the position of the communication device from a positioning portion of the device. The method may further comprise identifying the ambient sound and relating the identified sound to a music type. The method may further comprise identifying the movement as a dancing movement. The method may further comprise identifying the ambient sound and relating the identified sound to a music type. The event may be related to enjoyment or sports. The method may further comprise providing the position of the event on a map. The position may be provided by a communication network.

According to a second aspect of the invention, a method of providing information about the number of communication devices having a certain motion pattern is provided. Each communication device comprises a motion detector and a transceiver portion. The method comprises: detecting motion of the communication device, identifying motion pattern based on the detected motion, comparing the identified motion pattern to motion patterns from other communication devices, and compiling number of devices having substantially same motion pattern.

According to a third aspect of the invention, a method of providing information about the number of communication devices receiving ambient sound of a certain type is provided. The communication device comprises a sound receiving portion and a transceiver portion. The method comprises: receiving ambient sound by the sound receiving portion, identifying the sound, comparing the identified sound to sound received from other devices, and compiling number of devices receiving same type of ambient sound.

According to a fourth aspect of the invention a method of providing information about a device is provided. The device comprises a motion detector, a sound receiving portion and/or a positioning portion. The method comprises: detecting movement of the device by the motion detector, detecting ambient sound by the sound receiving portion, and/or detecting position of the device.

According to a fifth aspect of the invention, a wireless communication device is provided comprising a communication portion, a processing unit, a memory unit, a motion detecting sensor and a microphone. The processing unit is configured to receive data from the motion detecting sensor and signal from the microphone, process the sound signal and data from the motion detecting sensor, and provide result of processing to an arrangement for compiling the information relatable to an event. The wireless communication device may further comprise a positioning portion, configured to provide position of the communication device to the arrangement. The wireless communication device may further comprise a GPS (Global Positioning System) positioning unit.

According to a sixth aspect of the invention, a wireless communication device is provided comprising a communication portion, a processing unit, a memory unit, a motion detecting sensor, a positioning portion and a microphone, wherein the processing unit is configured to: receive data from the motion detecting sensor, receive a signal corresponding to ambient sound received by the microphone, detect a position of the device, and provide the motion type, the sound type and the position to an arrangement for generating information about an event.

According to a seventh aspect of the invention, a computer in a communication network server for compiling and providing information relating to an event is provided. The computer comprises a processor being configured to: receive motion data from a communication device, receive information relating to an ambient sound of the device, receive information about a position of the device, and compile the motion data, the ambient sound and the position to detect an event in vicinity of the communication device. The computer may further be configured to relate the motion data to a particular motion, the particular motion comprising one or several of dancing, exercising or sporting. The computer may further be configured to identify the ambient sound. The computer may further be configured to receive position of the communication device from one or several of the communication device or a communication network. The computer may further be configured to output the detected event as graphical information on a map accessible through a communication network. The graphical information may further include a number of communication devices relatable to the event.

According to another aspect of the invention a computer program product for providing information about an event is provided. The computer program product comprising: an first instruction set for receiving information about a movement of a device from a motion detector of the device, a second instruction set for receiving information about ambient sound of the device from a sound receiving portion of the device, a third instruction set for receiving information about position of the device, a fourth instruction set for corresponding the movement to a specific movement, a fifth instruction set for corresponding the ambient sound to a specific sound, a sixth instruction set for relating the specific movement and the specific sound to an event, and a seventh instruction set for providing position of the event to a user.

BRIEF DESCRIPTION OF THE DRAWINGS

The present invention will hereinafter be further explained by means of non-limiting examples with reference to the appended figures where.

DETAILED DESCRIPTION

A "device," as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a GPS device; a camera (e.g., video and/or still image camera) having communication ability; and any other computation or communication device capable of displaying media, such as a personal computer, a home entertainment system, a television, etc.

Shortly, the present invention relates to combining one or several types of information received from a number of mobile devices based on e.g. audio (music), movement (dance) and position, and providing a user with information corresponding to an event(s) based on the information.

One embodiment of the invention may be related to finding nightlife in a city.

Figure 1:
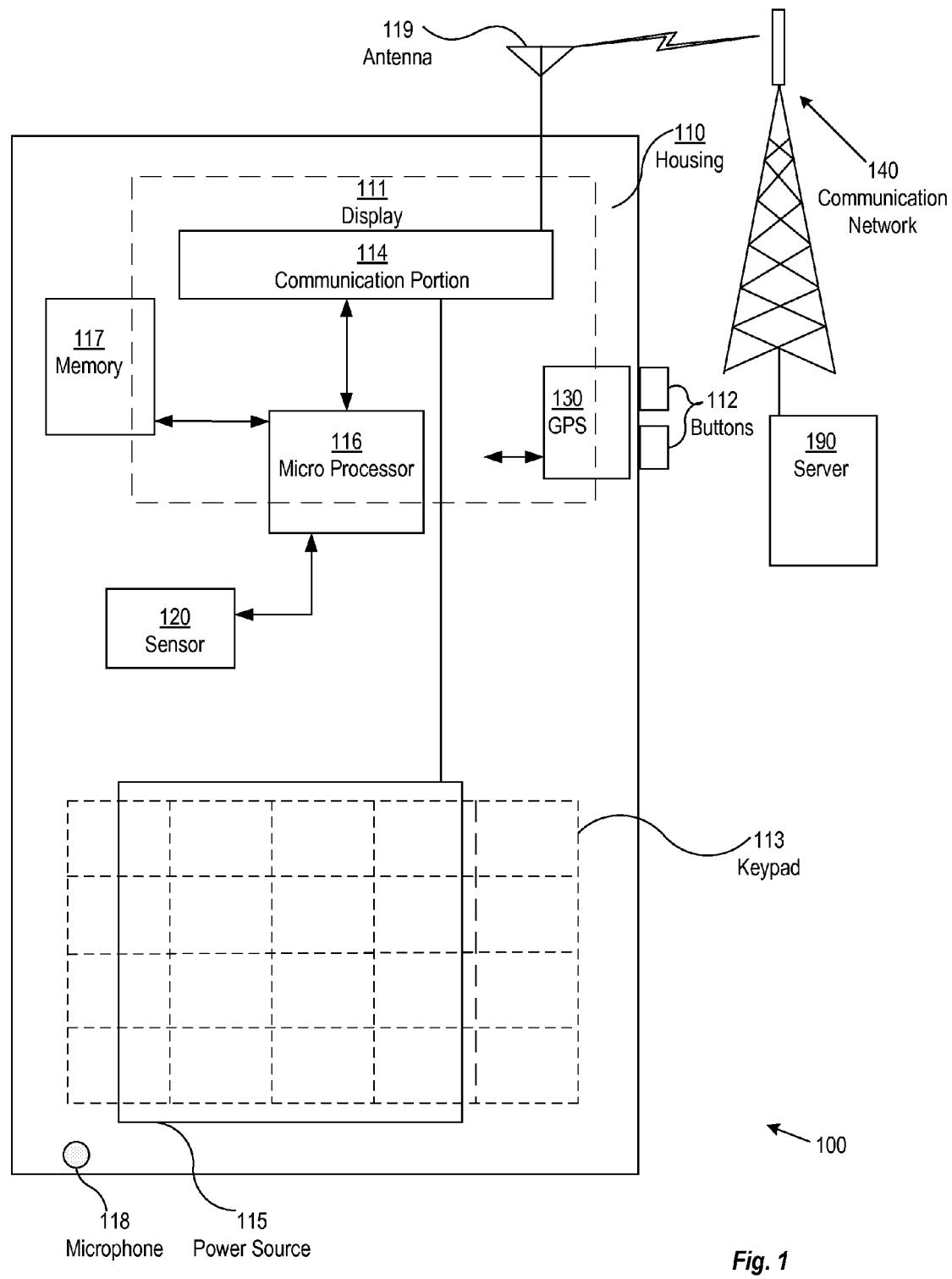
FIG. 1 shows a schematic communication device according to the present invention.

FIG. 1 illustrates one exemplary embodiment of a communication device according to the invention.

As shown in FIG. 1, an exemplary device 100 may include a housing 110, a display 111, control buttons 112, a keypad 113, communication portion 114, a power source 115, a micro processor 116 (or data processing unit), a memory unit 117, a motion detecting sensor 120, such as an accelerometer, and a microphone 118. The housing 110 may protect the components of device 100 from outside elements. Display 111 may provide visual information to the user. For example, display 111 may provide information regarding incoming or outgoing calls, media, games, phone books, the current time, a web browser etc. Control buttons 112 may permit the user to interact with device to cause device to perform one or more operations. Keypad 113 may include a standard telephone keypad. The motion detecting sensor 120 detects the motion of the device and may also enable applications such as commands input through gestures, indoor GPS functionality, game controls. The communication device may also comprise a GPS positioning portion 130, comprising additional antenna (or using the communication portion antenna) and GPS receiver. The microphone 118 is used to receive ambient sound, such as the voice of the user of the communication device or music.

The communication portion comprises parts (not shown) such as a receiver, a transmitter, (or a transceiver), an antenna 119 etc., for establishing and performing communication with one or several communication networks 140.

Figure 2:
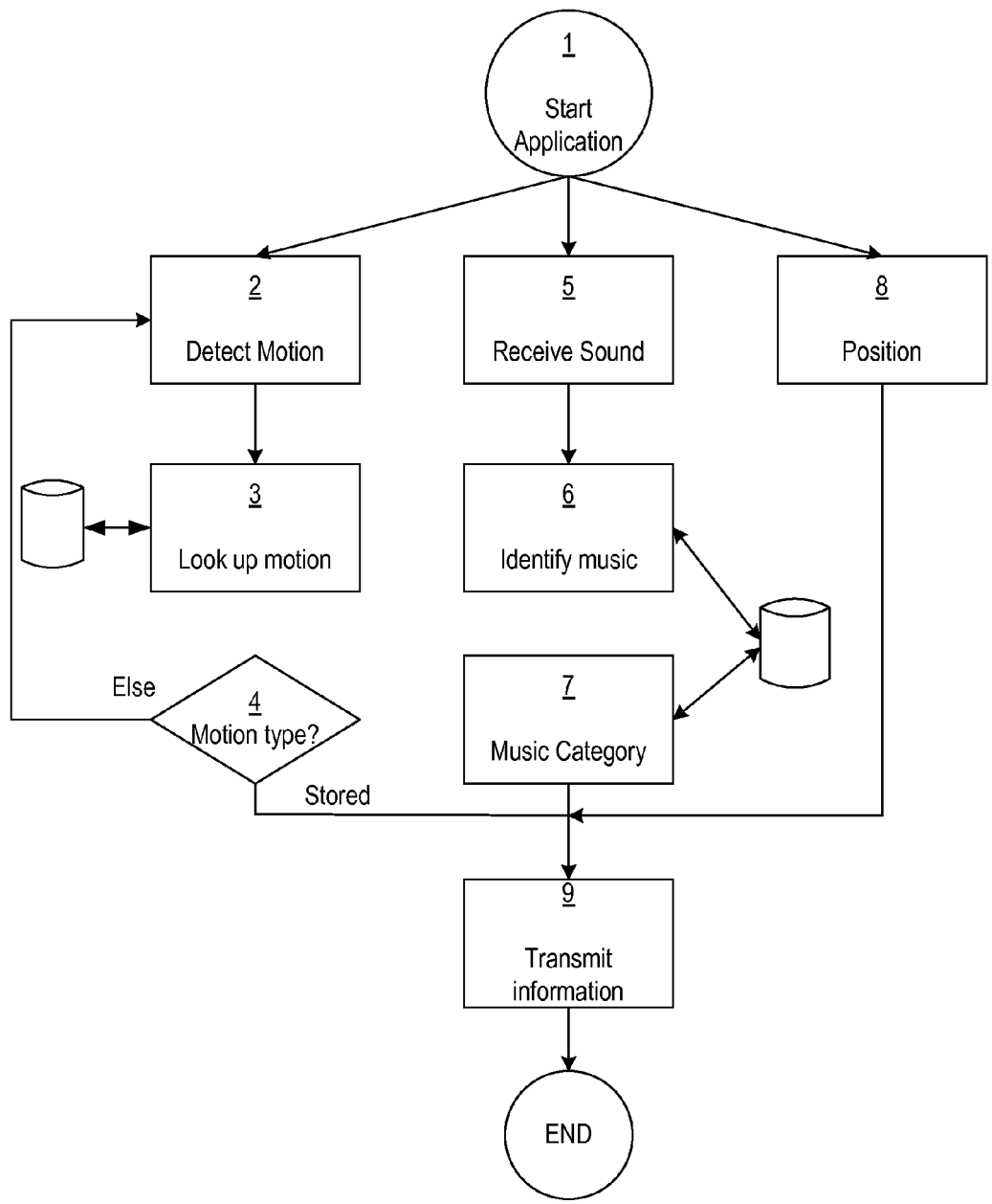
FIG. 2 is a flow diagram according to one embodiment of the invention.

According to one exemplary embodiment, the invention operates in the following way, as illustrated in the flow diagram of FIG. 2:

The mobile communication device 100 uses one or several of: the motion detecting sensor 120, the microphone 118 or the GPS positioning portion 130 to collect necessary data for the application of the invention.

When the application starts (1), the motion detecting sensor 120 may be used to detect (2) the acceleration (motion) of the communication device. The device may use an internal database or a network based database to determine (3) the type of the motion and it may be configured to detect an especial motion type and correspond it to a movement, e.g. a rhythmic movement having a specific oscillation. The detection procedure may be executed until a stored movement type is detected or changed.

The microphone may be used to record (5) ambient sound in form of music and use music tracking application, as described earlier, to identify (6) which music is played. The identification may be executed in the device or in an application executed on the server 190 of a service provider or network. The music (or sound type) may be categorized (7). In the case of detecting music, the music may be categorized to different types, such as dance music, rock, pop, house, etc.

The positioning portion is used to determine (8) the position of the communication device.

The positioning of the device may also be achieved using network positioning. The technology of locating may be based on measuring power levels and antenna patterns and uses the concept that a mobile phone always communicates wirelessly with one of the closest base stations, so if you know which base station the phone communicates with, you know that the phone is close to the respective base station.

Advanced systems determine the sector in which the mobile phone resides and roughly estimate also the distance to the base station. Further approximation can be done by interpolating signals between adjacent antenna towers. Qualified services may achieve a precision of down to 50 meters in urban areas where mobile traffic and density of antenna towers (base stations) is sufficiently high.

The information from the sensors, i.e. motion pattern, ambient sound and position of the device may be uploaded (9) (automatically using an executed application or manually) to a service provider server 190. The server compiles the information to find out an especial event. Combining the information relating to the motion for detecting the dance, ambient sound for detecting music and the position, the application may find a nightclub or the like.

In an elementary variant, the invention may only use music identification to provide information about the number of users listening to a certain type of music, artist and/or song.

Thus, the present invention according to one embodiment may use a combination of people's movement (dancing), music surroundings and total number of people to find special places in cities nightlife. It could work as a separate application or be used as a service where a layer that shows the event in real-time is added to a map application, for example Google® maps.

The information may be (on demand) sent to the mobile device textually (SMS) or as a map (MMS) or be available through browsing. The information may also be available on a network such as Internet for users to find a special event.

Figure 3:
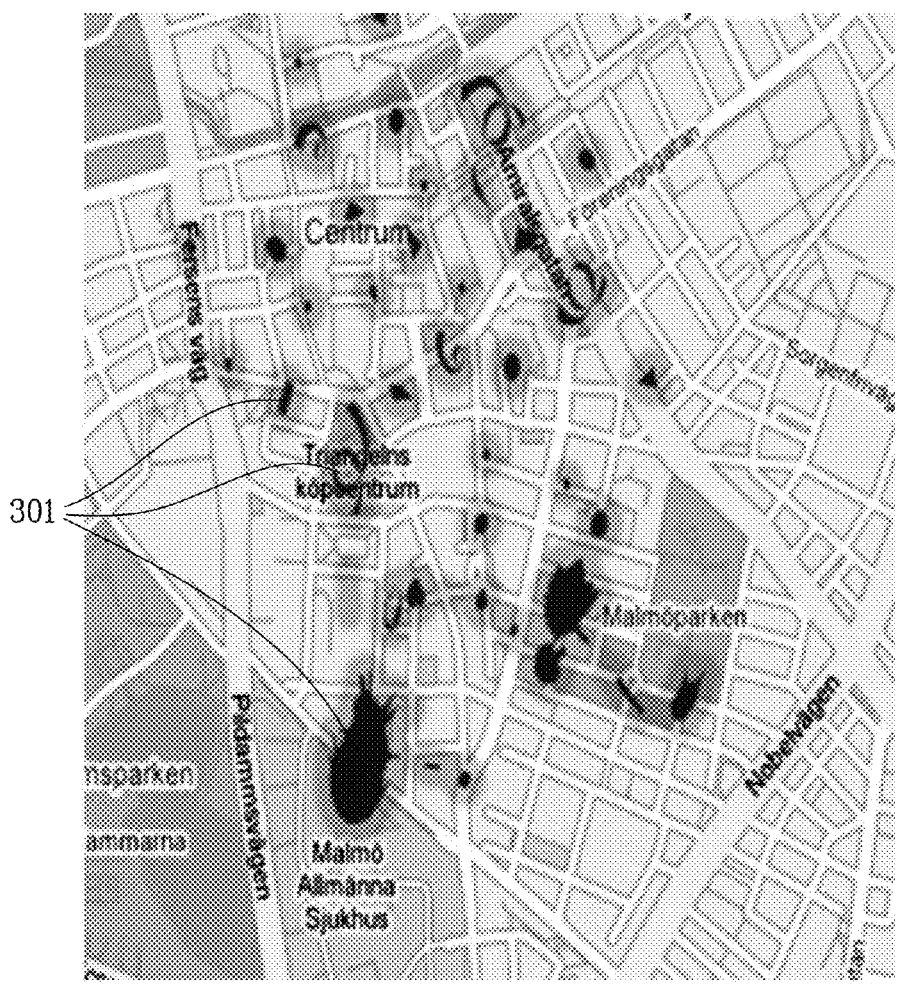
FIG. 3 is an exemplary map produced according to one exemplary embodiment of the present invention.

FIG. 3 illustrates a part of map of the city of Malmö in Sweden. The dark areas 301 show indication of events compiled according to the present invention and illustrated on the map according to the present invention. The size of the dark area may depend on the number of active devices providing information to the server. The indicators may have different sizes, colors, or other visual information such as textual information to provide information, such as event type (e.g. dance type), sound type (e.g. music), and number of people (popularity). Thus, the invention may only concern compiling information about the number of people dancing or listening to certain type of music.

Figure 4:
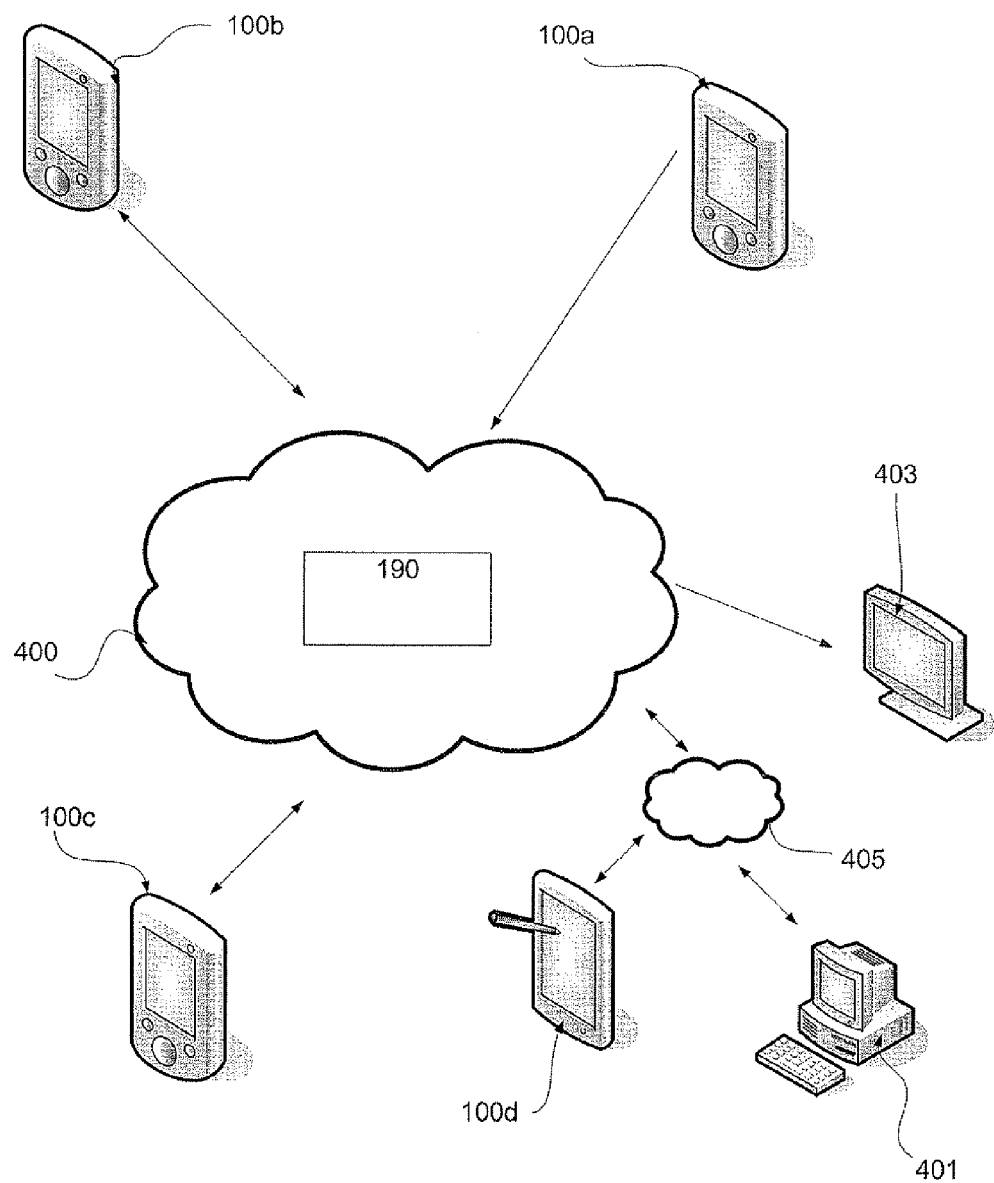
FIG. 4 shows a schematic communication network according to the present invention.

FIG. 4 illustrates a system according to one embodiment of the invention. In this case a number of mobile communication devices 100a-100c and a Personal Digital Assistant (PDA) 100d provide motion, sound and/or position information to the network 400. The server 190 in the network complies the information received from the mobile units and transmits the information back to the mobile devices 100b-100d, and/or a monitor 402 or a computer 403 accessing it, e.g. through Internet 405. Also, some of mobile devices may access the information through Internet.

The PDA 100d is assumed to have ability to record sound and detect motion and communicates with the server through Internet, e.g. using wireless communication such as WiFi.

The monitor 402 may be a part of a tourist guide system dedicated to display events.

The computer 403 may be used by users to browse the Internet.

In this case the communication device 100a may be arranged only to supply the server with data and not to receive event information.

The application of the invention may be provided with filters to only show special events such as dancing, movement or total number of people (devices). The music could be analyzed using tracking application, as described above, in order to find out exactly what type of music is being played. In one embodiment a time parameter may be added in order to dynamically detect changes over time. The areas of interest may be related to places of interest, such as nightclubs, discotheques, etc., in order to quickly find out what place it is.

The invention is not limited to finding and pointing out nightclubs; it may also be used to provide information about other types of events, such as sporting events, (sport) exercise meetings, conferences, meetings etc.

Figure 5:
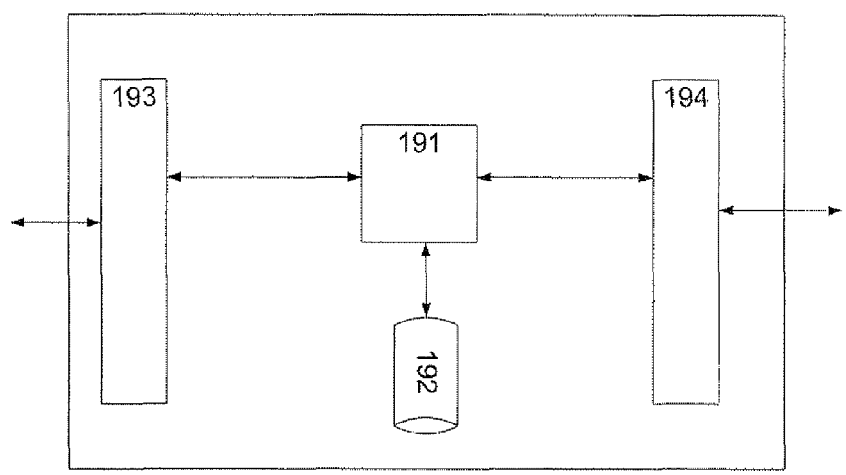
FIG. 5 shows a schematic computer unit according to one embodiment of the present invention.

FIG. 5 illustrates a schematic computer device arranged as a server 190 according to the present invention. The server 190 comprises a processing unit 191, one or several memory units 192, input interface 193 and output interface 194. One memory unit may comprise instructions executed by the processing unit 191 and another memory unit may comprise databases for events, motion types and/or music/sound types.

The input interface 193 is adapted to communicate with the communication devices either directly or through the base stations of the communication network. The output interface 194 is adapted to communicate with the other network units, e.g. gateways, DNSs, etc.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. In a first wireless communication device, a method of determining information related to a particular event based on information obtained by a plurality of second wireless communication devices associated with the particular event, the method comprising:

receiving, by the first wireless communication device and from a motion detector of each of the plurality of second wireless communication devices, movement information for the plurality of second wireless communication devices;

receiving, by the first wireless communication device and from a sound receiving portion of each of the plurality of second wireless communication devices, ambient sound related to the particular event;

determining, by a processor of the first wireless communication device, a position of each of the plurality of second wireless communication devices;

correlating, by the processor of the first wireless communication device, the movement information and the ambient sound to the particular event;

determining, by the processor of the first wireless communication device, a location of the particular event, based on the position of the plurality of second wireless communication devices; and determining, by the processor of the first wireless communication device, a type of the particular event associated with the movement information and the ambient sound of the plurality of second wireless communication devices occurring at the location, based on the correlating and the location of the particular event.

2. The method of claim 1, further comprising receiving information indicative of the position of each of the second wireless communication devices from a positioning portion of each of the second wireless communication devices.

3. The method of claim 1, further comprising:

identifying the ambient sound received from each of the plurality of second wireless communication devices;

relating the identified sound, received from each of the plurality of second wireless communication devices, to a particular type of music selected from a plurality of different types of music, and where the type of the particular event is determined further based on relating the identified sound, received from each of the plurality of second wireless communication devices, to the particular type of music.

4. The method of claim 1, further comprising:
identifying the movement information, for the plurality of second wireless communication devices, as corresponding to a dancing movement and not as another type of movement, and
where the type of the particular event is determined further based on identifying the movement information, for the plurality of second wireless communication devices, as corresponding to the dancing movement.

5. The method of claim 4, further comprising:
identifying the ambient sound, received from each of the plurality of second wireless communication devices; and
relating the identified ambient sound, received from each of the plurality of second wireless communication devices, to a particular type of music;
where the type of the particular event is determined further based on relating the identified ambient sound, received from each of the plurality of second communication devices, to the particular type of music.

6. The method of claim 1, further comprising:
presenting the position of the particular event using a graphic representation of the location, where a size of the graphic representation is based on a quantity of second wireless communication devices comprising the plurality of second wireless communication devices.

7. The method of claim 1, where the movement information, for each of the plurality of second wireless communication devices, and the ambient sound, received from each of the plurality of second wireless communication devices, are received via a communication network.

8. A computer memory device that stores computer-executable instructions, the computer-readable memory device comprising:
one or more instructions that, when executed by a processor, cause the processor to:
receive, from a motion detector of each of a plurality of wireless communication devices, motion information indicative of a movement of each of the plurality of wireless communication devices;
receive, from a sound receiving portion of each of the plurality of wireless communication devices, sound information indicative of ambient sound related to a particular event;
determine a location of each of the plurality of wireless communication devices;
correlate the movement information and the sound information to the particular event;
determine a location of the particular event, based on a position of the plurality of wireless communication devices;
identify the particular event as comprising a particular type of event associated with the movement information and the sound information of the plurality of wireless communication devices occurring at the location, based on the correlating and the location of the particular event; and
provide, via a network, information identifying the location of the particular event and information identifying the particular type of event to one or more of the plurality of wireless communication devices.

* * * * *